United States Patent
Sahlín et al.

[11] Patent Number: 5,251,247
[45] Date of Patent: Oct. 5, 1993

[54] METHOD OF SEALING A FUEL ROD BY WELDING

[75] Inventors: Thorbjörn Sahlín; Katarina Wisén, both of Västerås, Sweden

[73] Assignee: ABB Atom A.B., Västerås, Sweden

[21] Appl. No.: 768,740

[22] PCT Filed: May 8, 1990

[86] PCT No.: PCT/SE90/00305
§ 371 Date: Oct. 15, 1991
§ 102(e) Date: Oct. 15, 1991

[87] PCT Pub. No.: WO90/13898
PCT Pub. Date: Nov. 15, 1990

[30] Foreign Application Priority Data
May 9, 1989 [SE] Sweden .............. 8901635-6

[51] Int. Cl.$^5$ ................................. G21C 3/10
[52] U.S. Cl. ........................... 376/451; 376/261
[58] Field of Search ................. 376/451, 261; 976/DIG. 46, DIG. 75; 219/137.61, 162, 427

[56] References Cited
U.S. PATENT DOCUMENTS

| | | | |
|---|---|---|---|
| 3,836,431 | 9/1974 | Flipot et al. | 376/415 |
| 3,842,238 | 10/1974 | Boyko et al. | 219/137 |
| 3,902,038 | 8/1975 | Heichel | 219/137 |
| 4,273,983 | 6/1981 | Ogawa et al. | 219/93 |
| 4,478,787 | 10/1984 | Nadkarni et al. | 419/8 |

Primary Examiner—Donald P. Walsh
Assistant Examiner—Meena Chelliah
Attorney, Agent, or Firm—Watson, Cole, Grindle & Watson

[57] ABSTRACT

The invention relates to a method of sealing a fuel rod (1) after pressurization with helium. The method comprises supplying helium to the fuel rod via a fill hole (3) provided through the plug (2). Over the fill hole (3) there is placed a body (4) which, upon sealing, is welded against the plug by means of resistance projection welding.

7 Claims, 1 Drawing Sheet

METHOD OF SEALING A FUEL ROD BY WELDING

TECHNICAL FIELD

The invention relates to a method for sealing a fuel rod by welding after the fuel rod has been pressurized with helium.

BACKGROUND ART

In the manufacture of nuclear fuel for light water reactors, tubes of usually a zirconium alloy, such as Zircaloy-2 or Zircaloy-4, are provided with an end closure, whereupon the tube is filled with fuel pellets to the desired length. After that, the rod is pressurized with helium before it is completely sealed. By filling the fuel rod with helium, the heat transfer from the pellet out towards the coolant is improved.

During the sealing of the fuel rod, the rod is usually provided with plugs of a zirconium alloy which are designed such that part of the plug may make contact with the tube end of the rod, and by welding around the joint between tube and plug, the rod is sealed. A number of different welding methods, such as TIG welding, EB welding or resistance welding, are used in this connection. When using welding methods which do not require vacuum, for example TIG and resistance welding, pressurization of the rod with helium can be carried out in connection with the plug being welded on. For welding methods which require vacuum, for example EB welding, pressurization of the rod must be carried out separately. This is done by providing the plug with a fill hole through which helium may be supplied to the rod and which is thereafter sealed by means of TIG welding.

The disadvantages of the prior art methods of sealing a fuel rod after pressurization are that TIG welding functions badly in helium environments. High voltages are required for igniting the welding arc, and welding electrodes are consumed very rapidly and have to be replaced. Since this type of manufacturing usually takes place in continuous lines, frequent replacements of welding electrodes entail considerable drawbacks.

Conventional resistance welding, of the joint between the plug and the tube end of the rod entails problems in that the type of defects which may occur at the weld joint after resistance welding, such as, e.g., oxide streaks, cannot be controlled by some form of non-destructive testing. Since nuclear fuel rods operate at high pressures and contain substances, the spreading of which outside the rod is not desirable, it is of the utmost importance that sealing welds do not contain defects which may lead to continuous cracks in the weld.

SUMMARY OF THE INVENTION

To solve the above problems, according to the invention the circular weld between the plug and the rod may be carried out with a method such as, e.g., EB welding or TIG welding, which permit inspection by means of non-destructive testing and, after that, pressure reduction with helium may be carried out via the plug through a fill hole provided for the purpose. For sealing the fill hole, a body of a zirconium alloy of suitably the same type as that of which the plug consists is placed over the fill hole and formed such that the body has a volume which is larger than the volume of the upper part of the fill hole and the body makes contact with the edge of the fill hole along a border so that the contact surface is as small as possible. This can be accomplished by giving at least part of the body a tapering diameter, for example conical or spherical. When the rod is to be sealed, this can be done by resistance projection welding. The rod is thereby placed between two electrodes, one of which is placed over the body. A force is applied to one electrode and an electric current is passed through the body and the plug. Since the contact surface between body and plug is small, a high current concentration is obtained and the heating of the parts of the workpiece, which are in contact with each other, is good. When the body is pressed against the fill hole, material from the edge of the fill hole is welded together with material from the body and the body is pressed into the fill hole. The upper surface of the body is also deformed and may be pressed so that the upper surface of the body gets on a level with the surface of the plug. By sealing the fill hole in this way, a seal is obtained which is very tight because a body with a larger diameter than the opening of the fill hole has been pressed down into the fill hole and because the body is formed such that, when applied over the fill hole, it has a very small contact surface.

In the manner described above, it is possible to solve the previous problems in connection with TIG welding where, admittedly, a weld capable of being inspected by means of non-destructive testing has been achieved but where the welding method has caused great inconvenience by necessitating frequent electrode replacements. The problems with inspection of resistance welds which have previously existed are also considerably reduced by means of the invention by performing the resistance welding on a non-loaded part of the rod, and by forming a body of admixing material, as described above, the sealing of the fill hole is secured in a satisfactory manner.

DETAILED DESCRIPTION OF THE PREFERRED EMBODIMENT

Figure 1:
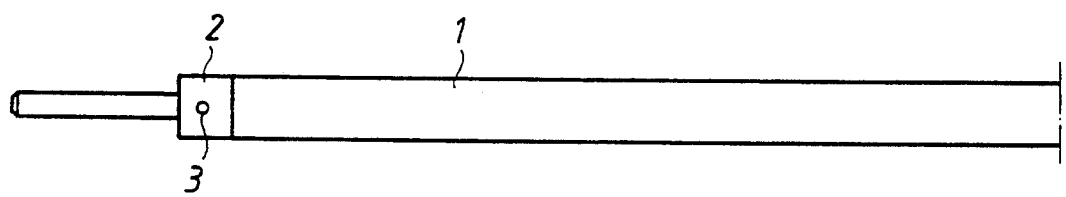
FIG. 1 shows a portion of a fuel rod having a plug at one end.

FIG. 1 shows part of a fuel rod 1 with a plug 2. The plug is provided with a fill hole 3. The fuel rod 1 consists of a tube of a zirconium alloy, for example Zircaloy-2 or Zircaloy-4, or a zirconium-niobium alloy. Pellets of fuel, usually of uranium dioxide, are placed in the tube. The tube is sealed at both ends by means of welded-on plugs. The plugs are made of a zirconium alloy and may be of varying design. One of the plugs of the rod is provided with a fill hole for filling helium into the rod.

Figure 2:
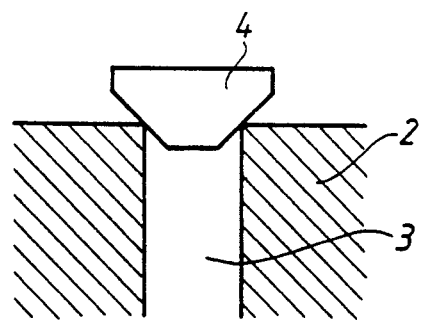
FIG. 2 depicts a fill hole of the plug with a body according to the present invention in position to close the fill hole.

FIG. 2 shows a cross-section through a plug with a fill hole. Above the fill hole is placed a body 4, the volume of which is larger than the upper part of the fill hole and the surface of which is partially conical. Concentrically around the fill hole the plug is provided with a slot (not shown in the figure). The resistance projection welding is carried out in a chamber and the rod 1 is placed in a V-shaped notch in an electrode block of copper or some copper alloy. The other electrode is placed over the body 4. To obtain a favorable voltage state in the body, the body is preheated by resistance heating with a lower current intensity than what is required for welding, so that the surface of the body becomes plastic. Thereafter, the current intensity and the press force on the body increase to effect welding. It is advantageous to use alternating current to impart sufficient heating to the body prior to welding.

The method is useful for all types of fuel rods which are pressurized with helium, both for BWR and PWR reactors, and also for other reactor designs operating with pressurized fuel.

We claim:

1. A method of sealing a fuel rod which has been pressurized with helium and which includes a tube having a plug at one end thereof, the plug providing a fill hole which has an outer portion of a predetermined cross sectional shape and dimension, said method comprising the steps of:
   (a) providing a zirconium alloy body having a portion whose cross sectional shape corresponds with said predetermined cross sectional shape of said outer portion of said fill hole and which provides an outer surface that defines an endless line of contact which is equal in dimension to said dimension of said outer portion of said fill hole,
   (b) inserting said body into said fill hole until said endless line of contact of said outer surface of said portion makes contact with said outer portion of said fill hole, and
   (c) sealingly connecting said body to said plug by resistance projection welding along said endless line of contact while pressing said body against said plug.

2. A method according to claim 1, wherein said portion of said body has a spherical shape.

3. A method according to claim 1, wherein said portion of said body has a frustoconical shape.

4. A method according to claim 3, wherein in step (c) said resistance projection welding is conducted at a first current density and including between steps (b) and (c) a step (b') of preheating said body at a second current density which is less than said first current density.

5. A method according to claim 4, wherein in step (c) said resistance projection welding employs alternating current.

6. A method according to claim 1, wherein in step (c) said resistance projection welding is conducted at a first current density and including between steps (b) and c) a step (b') of preheating said body at a second current density which is less than said first current density.

7. A method according to claim 6, wherein in step (c) said resistance projection welding employs alternating current.

* * * * *